US007721758B2

(12) United States Patent

Murrenhoff et al.

(10) Patent No.: US 7,721,758 B2
(45) Date of Patent: May 25, 2010

(54) VALVE WITH INCREASED DYNAMIC RESPONSE

(75) Inventors: Hubertus Murrenhoff, Aachen (DE); Christoph Boes, Nufringen (DE)

(73) Assignee: Moog GmbH, Boeblingen (DE)

( * ) Notice: Subject to any disclaimer, the term of this patent is extended or adjusted under 35 U.S.C. 154(b) by 816 days.

(21) Appl. No.: 10/527,204

(22) PCT Filed: Aug. 1, 2003

(86) PCT No.: PCT/EP03/08550

§ 371 (c)(1), (2), (4) Date: Oct. 16, 2006

(87) PCT Pub. No.: WO2004/033921

PCT Pub. Date: Apr. 22, 2004

(65) Prior Publication Data

US 2007/0079879 A1 Apr. 12, 2007

(30) Foreign Application Priority Data

Sep. 11, 2002 (DE) ................................ 102 41 977

(51) Int. Cl.
*F16K 37/00* (2006.01)

(52) U.S. Cl. .............. 137/554; 137/625.66; 137/625.69

(58) Field of Classification Search ................. 137/554, 137/553, 625.69, 625.34, 625.66; 251/129.06
See application file for complete search history.

(56) References Cited

U.S. PATENT DOCUMENTS

| | | | | |
|---|---|---|---|---|
| 4,205,590 | A | 6/1980 | Stegner | |
| 4,333,387 | A | 6/1982 | Seitz | |
| 4,907,615 | A * | 3/1990 | Meyer et al. | 137/625.64 |
| 6,789,570 | B2 * | 9/2004 | Beyrak et al. | 137/554 |
| 7,422,033 | B2 * | 9/2008 | Barber | 137/625.64 |

FOREIGN PATENT DOCUMENTS

| | | | |
|---|---|---|---|
| DE | 802 298 | C | 2/1951 |
| DE | 198 41 660 | A1 | 3/2000 |
| DE | 197 11 781 | C2 | 5/2000 |
| EP | 01 098 101 | A | 5/2001 |
| GB | 677 672 | A | 8/1952 |

* cited by examiner

*Primary Examiner*—Kevin L Lee
(74) *Attorney, Agent, or Firm*—Phillips Lytle LLP

(57) ABSTRACT

A valve (1) comprises: a body (2); a bushing (3) slidably mounted on said body; a valve spool (4) slidably mounted on said bushing; said bushing and spool having respective control edges (5) that are adapted to cooperate with one another as a function of the relative position between said bushing and spool to vary the size of a control opening therebetween; a first drive (11) operatively arranged to controllably move one of said bushing and spool relative to said body; and a second drive (12) operatively arranged to controllably move the other of said bushing and spool relative to said body; whereby said first and second drives may be selectively operated to move said bushing and spool simultaneously in opposite directions to increase the dynamic response of said valve.

9 Claims, 1 Drawing Sheet

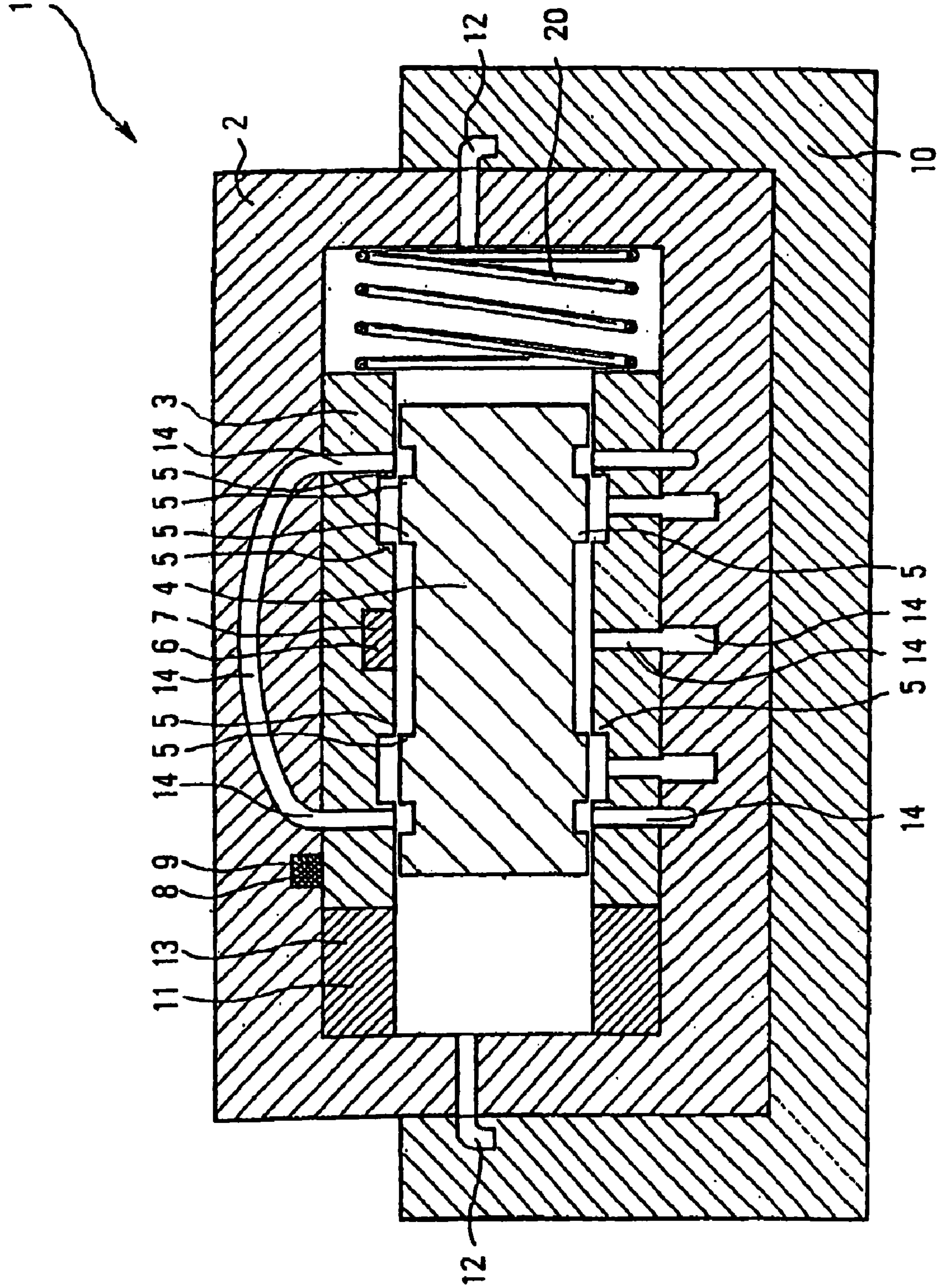
1
2
3
4
5
6
7
8
9
10
11
12
13
14
20

VALVE WITH INCREASED DYNAMIC RESPONSE

TECHNICAL FIELD

The present invention relates generally to the field of valves having relatively-movable spools and bushings to vary the size of control openings that are used to vary a fluid parameter (e.g., flow, pressure, etc.), and, more particularly, to improved valves, particularly for use in servosystems, having bushings and spools that may be moved simultaneously in opposite directions to increase the dynamic response of the valve.

BACKGROUND ART

High dynamic response valves are known in the art. These valves are often used, in both open and closed servoloops, to control fluid flows and/or fluid pressures in hydraulic systems. These systems may have a bushing movable relative to a body, and a valve spool movable relative to the bushing. The bushing and spool have control edges that are movable relative to one another to vary the sizes of one or more control openings by means of which the fluid parameter is controlled. Heretofore, one of the spool and bushing has been movable relative to the other by means of a direct or indirect drive.

Directly-controlled valves have used electromechanical transformers, proportional magnets, linear motors, plunger coils or piezoelectric converters to move the associated valve member (i.e., either spool or bushing) relative to the body. Directly-controlled valves have the disadvantage that fast reactions can only be realized with short-stroke drivers. Indirectly-controlled valves have used mechanical-hydraulic transformers, pressure-control of spool position, nozzle baffles and nozzle pipes. Highly-dynamic valves have used both direct and servo-assisted control.

In the prior art, either the position of the spool or the bushing relative to the body was varied. Thus, the prior art devices had an active (i.e., movable) control edge and an inactive (i.e., non-movable) control edge. If the spool was movable relative to the bushing, the active edge was on the spool, and the inactive edge was on the bushing. Conversely, if the bushing was movable relative to the spool, then the active edge was on the bushing and the inactive edge was on the spool. The attainable frequency of the valve was determined by the frequency response of the associated valve driver.

Accordingly, it would be generally desirable to provide an improved valve of this spool-bushing type that is capable of improved dynamic response.

DISCLOSURE OF THE INVENTION

With parenthetical reference to the corresponding parts, portions or surfaces of the disclosed embodiment, merely for purposes of illustration and not by way of limitation, the present invention broadly provides an improved valve having an increased dynamic response capability.

The improved valve (1) broadly includes: a body (2); a bushing (3) slidably mounted on the body; a valve spool (4) slidably mounted on the bushing; the bushing and spool having respective control edges (5) that are adapted to cooperate with one another as a function of the relative position between the bushing and spool to vary the size of a control opening therebetween; a first drive (11) operatively arranged to controllably move one of the bushing and spool relative to the body; and a second drive (12) operatively arranged to controllably move the other of the bushing and spool relative to the body; whereby the first and second drives may be selectively operated to move the bushing and spool simultaneously in opposite directions to increase the dynamic response of the valve.

The first drive may include a piezoelectric element (13) or a plunger coil.

The valve may further include a spool position sensing device (6), such as an eddy current sensor (7) or the like, for sensing the position of the spool relative to the bushing.

The valve may further include a bushing position sensing device (8), such as an eddy current sensor, a Hall effect sensor (9), a linear variable displacement transducer, or the like, for sensing the position of the bushing relative to the body.

The first drive may be operatively arranged to control the position of the bushing relative to the body, and wherein the second drive may be operatively arranged to control the position of the spool relative to the bushing.

One of the first and second drives may have a dynamic response greater than the other of the first and second drives.

One of the first and second drives may have a stroke that is greater than that of the other of the first and second drives.

This is achieved in that the valve spool and also the bushing are embodied such that they are oppositely slidable to one another at the same time The distances to be covered by the spool and/or bushing during a control movement can therefore be smaller. The times taken from one control state to the next are shorter. High dynamic control of the valve is therefore possible. Also, readily obtainable off-the-shelf standard components can be used in a valve according to the invention. This simplifies the procurement of the individual elements for assembly.

It is advantageous if the valve comprises a spool position sensor (7) for determining the spool position relative to the bushing position. In this type of valve, it is possible to determine the exact position of the spool with respect to the bushing and to actuate the valve accordingly. The bushing position determining device (8) may be a non-contacting eddy current sensor, which operates without wear and is rugged. Also it is extremely resistant to corrosion, and service life of the valve is increased.

In another embodiment, the valve includes a bushing position sensor (8) for determining the position of the bushing relative to the body. This facilitates the avoidance of drift of the bushing and spool in the main body. Consequently, trouble-free functioning of the valve is enabled also over a lengthy period of use. Knowledge of the absolute bushing position relative to the body is necessary if the spool and bushing are servo-assisted.

It is also advantageous if the bushing position determining device comprises an eddy current sensor, a Hall effect sensor or an inductive displacement transducer, such as a linear variable differential transformer (LVDT), or the like. Since possibly the exploitation of the property that a movement of electrons in the magnetic field is influenced and a thereby ensuing deflection can be acquired as a voltage on the Hall effect sensor, this has the advantage that very large magnetic fields can be measured and the measurement range of Hall effect sensors is noticeably larger than those of other sensors. The use of known measurement sensors in the spool position determining device, or in the bushing position determining device, is advantageous in this variant, because costs and effort in the procurement of the appropriate sensors can be avoided.

If the valve comprises a primary drive device and/or a high frequency drive device, then in this variant it is advantageous if both the bushing and the spool are movable. Also, it is possible to combine the two different drive device principles (e.g., by providing a primary drive device and a high frequency drive device).

In one form, the primary drive device comprises at least one pilot valve influencing the movement of the bushing or the spool, then the application of a wear-free and rugged standard component is advantageously taken up.

In another embodiment, a first actuator valve is used to control movement of the bushing, and a second actuator is used to control movement of the spool. Rugged and particularly small and compact elements are then used for the spool and the bushing on the drive side.

In one variant it is also advantageous if the valve at least comprises a high frequency drive device. A high frequency drive device has the significant advantage that it has very short response times.

If the high frequency drive device comprises a piezoelement or a plunger coil, small dimensions of the high frequency drive devices are possible. Small installation spaces are desirable.

It is also advantageous in a variant if the high frequency drive device controls at least a displacement of the bushing. Consequently, the response time of the bushing is minimized during the control.

In a further embodiment, it is advantageous if the high frequency drive device exhibits a high inherent dynamic response and a low stroke, and the primary drive device exhibits a low inherent dynamic response and a large stroke. Since the high frequency drive device effectively complements the primary drive device in terms of inherent dynamic response and servo gain, particularly fast control times are possible. The combination of a highly dynamic response/short stroke and medium (low) dynamic response/long stroke leads to high servo gain.

If the high frequency drive device exhibits a low inherent dynamic response and a large stroke, and the primary drive device exhibits a high inherent dynamic response and a low stroke, then, in another form, an exchange of high frequency drive device elements with primary drive device elements is possible. The advantage of a particularly fast control of the individual components of the valve is however ensured.

Accordingly, the general object of the invention is to provide a valve having an improved dynamic response capability.

Another object is to provide a valve having a bushing mounted for movement relative to a body, and having a valve spool mounted for movement relative to the bushing, with the bushing and spool being movable simultaneously to vary the relative positions of control edges on the bushing and spool.

These and other objects and advantages will become apparent from the foregoing and ongoing written specification, the drawing, and the appended claims.

BRIEF DESCRIPTION OF THE DRAWINGS

The FIGURE is a fragmentary longitudinal vertical cross-section through one form of the improved valve.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms “horizontal”, “vertical”, “left”, “right”, “up” and “down”, as well as adjectival and adverbial derivatives thereof (e.g., “horizontally”, “rightwardly”, “upwardly”, etc.), simply refer to the orientation of the illustrated structure as the particular drawing FIGURE faces the reader. Similarly, the terms “inwardly” and “outwardly” generally refer to the orientation of a surface relative to its axis of elongation, or axis of rotation, as appropriate.

In the FIGURE, the valve 1 is shown in longitudinal cross-section. The valve 1 comprises a main body 2 in which a bushing 3 is movably mounted. The bushing 3 has control edges 5 on its inner surface. The control edges 5 are formed in the interior of the bushing 3. A spool 4, with control edges 5 formed on its outer surface, is mounted for sliding movement within the bushing 3.

Through-openings 14 pass through the bushing 3. The through-openings 14 are connected with through-openings 14 in the main body 2.

The bushing 3 is constructed for movement using a high frequency drive device 11 in this embodiment. The high frequency drive device 11 can be selectively actuated to slide the bushing 3 in one direction. The high frequency drive device 11 comprises the piezoelement 13. The piezoelement 13 has the advantage of a very fast response and pushes the bushing 3 in one direction. A return movement is provided by a spring 20.

In this embodiment, the spool 4 can be moved either in one direction or the other by differential fluid pressures in the spool end chambers. The fluids are transported through passageways 12 to one side or the other of the spool 4 by a primary drive device 10. The passageways 12 are provided via a primary drive device 10, which exhibits feed channels for providing the fluid to the pilot valves 12, with preferably an incompressible fluid. The feed channels are connected to the pilot valves. Alternatively or in support, the use of the spring 20 can be considered.

The position of the spool 4 in the bushing 3 is determined by an eddy current sensor 7 embedded in the bushing 3, the said sensor forming part of a bushing position determining device 6.

A bushing position determining device 8, such as a Hall effect sensor 9, is also embedded in the housing 2. The Hall effect sensor 9 is located between the housing 2 and the bushing 3. The exact positions of the bushing 3 and the spool 4 with respect to the housing 2 and to one another are determined by the position determination using the bushing position determining device 6 and the bushing position determining device 8. In other embodiments the bushing position determining device 6 and the absolute position determining device 8 comprise other sensors known from the state of the art.

In another form, the primary drive device 10 and the high frequency drive device 11 also use standard known elements from the state of the art.

Alternatively, the movement of the bushing 3 can be advantageously achieved by a transfer of force through a transfer medium, such as an incompressible fluid (e.g., oil), whereby the movement of the spool 4 is also achieved via a transfer medium, such as an incompressible fluid (e.g., oil). The two transfer media can be controlled separately from one another. The possibility of a predefined forced coupling between the two transfer media can also be used here.

The spool can be formed for movement solely through the effect of the transfer medium in both directions. However, it is also possible to provide other movement devices at one end, which, for example, derive their energy from a spring force for moving the spool and/or bushing.

Therefore, while the presently preferred form of the improved valve has been shown and described, and several modifications thereof discussed, persons skilled in this art will readily appreciate that various additional changes and modifications may be made without departing from the spirit of the invention, as defined and differentiated by the following claims.

What is claimed is:

1. A valve (1), comprising:

a body (2);

a bushing (3) slidably mounted on said body;

a valve spool (4) slidably mounted on said bushing;

said bushing and spool having respective control edges (5) that are adapted to cooperate with one another as a function of the relative position between said bushing and spool to vary the size of a control opening therebetween;

a first drive (11) operatively arranged to controllably move one of said bushing and spool relative to said body; and a second drive (12) operatively arranged to controllably move the other of said bushing and spool relative to said body;

whereby said first and second drives may be selectively operated to move said bushing and spool simultaneously in opposite directions to increase the dynamic response of said valve.

2. A valve as set forth in claim 1 wherein said first drive includes a piezoelectric element (13) or a plunger coil.

3. A valve as set forth in claim 1, and further comprising:

a spool position sensing device (6) for sensing the position of said spool relative to said bushing.

4. A valve as set forth in claim 3 wherein said spool position sensing device includes an eddy current sensor (7).

5. A valve as set forth in claim 1, and further comprising:

a bushing position sensing device (8) for sensing the position of said bushing relative to said body.

6. A valve as set forth in claim 5 wherein said bushing position sensing device includes an eddy current sensor, a Hall effect sensor (9), or a linear variable displacement transducer.

7. A valve as set forth in claim 1 whereon said first drive is operatively arranged to control the position of said bushing relative to said body, and wherein said second drive is operatively arranged to control the position of said spool relative to said bushing.

8. A valve asset forth in claim 1 wherein one of said first and second drives has a dynamic response greater than the other of said first and second drives.

9. A valve as set forth in claim 1 wherein one of said first and second drives has a stroke that is greater than that of the other of said first and second drives.

* * * * *